(12) United States Patent
Raghu et al.

(10) Patent No.: US 8,878,872 B1
(45) Date of Patent: Nov. 4, 2014

(54) SYSTEM, DEVICE AND METHOD FOR GENERATING AN OVERLAY OF NAVIGATION CHART INFORMATION

(75) Inventors: Kaushik Raghu, Cedar Rapids, IA (US); Chris R. Simons, Cedar Rapids, IA (US)

(73) Assignee: Rockwell Collins Inc., Cedar Rapids, IA (US)

( * ) Notice: Subject to any disclaimer, the term of this patent is extended or adjusted under 35 U.S.C. 154(b) by 170 days.

(21) Appl. No.: 13/404,603

(22) Filed: Feb. 24, 2012

(51) Int. Cl.
  *G09G 5/00* (2006.01)
(52) U.S. Cl.
  USPC ............ 345/629; 345/660; 345/641; 345/156
(58) Field of Classification Search
  USPC ................. 345/629, 660, 619, 641, 647, 156; 701/3, 16, 120
  See application file for complete search history.

(56) References Cited

U.S. PATENT DOCUMENTS

| | | | |
|---|---|---|---|
| 5,030,117 A * | 7/1991 | Delorme | 434/130 |
| 6,392,661 B1 * | 5/2002 | Tankersley | 345/660 |
| 6,614,419 B1 * | 9/2003 | May | 345/156 |
| 7,693,621 B1 * | 4/2010 | Chamas | 701/16 |
| 8,139,089 B2 * | 3/2012 | Doyle et al. | 345/647 |
| 8,223,172 B1 * | 7/2012 | Miller et al. | 345/660 |
| 2006/0197781 A1 * | 9/2006 | Arutunian | 345/629 |
| 2007/0097151 A1 * | 5/2007 | Rosenberg | 345/660 |
| 2008/0010262 A1 * | 1/2008 | Frank | 707/3 |
| 2008/0010273 A1 * | 1/2008 | Frank | 707/5 |
| 2008/0010605 A1 * | 1/2008 | Frank | 715/765 |
| 2008/0068380 A1 * | 3/2008 | McAvoy et al. | 345/629 |
| 2009/0240431 A1 * | 9/2009 | Chau et al. | 345/629 |
| 2009/0265050 A1 * | 10/2009 | Burpee | 701/16 |
| 2009/0284530 A1 * | 11/2009 | Lester et al. | 345/440 |
| 2009/0303254 A1 * | 12/2009 | Broms | 345/660 |
| 2010/0152924 A1 * | 6/2010 | Pandit et al. | 701/3 |
| 2011/0164060 A1 * | 7/2011 | Miyazawa et al. | 345/660 |
| 2011/0191014 A1 * | 8/2011 | Feng et al. | 345/660 |
| 2012/0143482 A1 * | 6/2012 | Goossen et al. | 701/120 |
| 2013/0147841 A1 * | 6/2013 | Coussemaeker et al. | 345/634 |

\* cited by examiner

*Primary Examiner* — Chante Harrison
(74) *Attorney, Agent, or Firm* — Donna P. Suchy; Daniel M. Barbieri (57) ABSTRACT

Present novel and non-trivial system, device, and method for generating an overlay of navigation chart information. A chart generator establishes an image data set comprised of chart information data. The chart information is visual navigation information appearing on a chart and drawn to a scale. The chart information, as it visually appears on the navigation chart, is reproduced in a first image. Then, an input shape selected or created by a pilot and placed over the first image is received, from which a geographical region is defined from the input shape. Then, the image data set is updated with overlay data comprised of second chart information data. The second chart information is visual navigation information appearing on a second navigation chart within the geographical region and drawn to a second scale. The second chart information is reproduced as an overlay sized as a proportion of scales.

22 Claims, 8 Drawing Sheets

SYSTEM, DEVICE AND METHOD FOR GENERATING AN OVERLAY OF NAVIGATION CHART INFORMATION

BACKGROUND OF THE INVENTION

1. Field of the Invention

This invention pertains generally to the field of vehicle display units that present navigation information to the user of a vehicle such as the pilot of an aircraft.

2. Description of the Related Art

With an increased presence of fixed electronic flight displays installed in aircraft and portable electronic flight displays carried by pilots (e.g., electronic flight bags, portable tablets, etc. . . . ), the use of paper charts is being replaced with the use of electronic charts that are viewable on screens of electronic displays. Although paper charts contain an abundance of information, the amount of information viewable to a pilot is limited by the screen size of the display.

When a pilot wishes to form a clear mental image of present and future navigation needs, he or she might spend a significant amount of effort switching between charts to piece together bits of navigation information that is presented on one chart but not another. For example, when a pilot transitions from low altitude flight to high altitude flight or vice versa, he or she will likely have to switch charts; that is, when transitioning from a departure phase of flight or to an arrival phase of flight, the act of switching between charts can cause an undesirable increase to the pilot's workload and create an unsafe flying condition by distracting the pilot's attention.

Besides flight charts, the advent of the Flight Management System ("FMS") allows the pilot to enter an approved flight plan using navigation information stored in an electronic database; one common database used by the aviation industry conforms to ARINC Specification 424 ("CARING 424"), an industry standard published by Aeronautical Radio, Incorporated ("ARINC"). ARINC 424 provides a standardized format of navigation information stored in standard electronic records and fields within each record. Because ARINC 424 standardizes the storage of navigation information, navigation records corresponding to information of an approved flight plan may be retrieved from the ARINC 424 database and used to generate navigation information related to the flight plan that may be presented on, for example, a navigation display ("ND") of an Electronic Flight Instrument System ("EFIS").

When a flight plan and other navigation information are presented on the ND of an EFIS from data retrieved from an ARINC 424 database, navigation information printed on a paper chart or published to an electronic chart might be omitted; that is, navigation information appearing on the navigation chart might not be visually presented on the ND. Moreover, the navigation information presented on the ND might not look like the navigation information presented in a navigation chart; that is, the visual appearances of navigation information presented on the ND may differ from those appearing on a navigation chart.

BRIEF SUMMARY OF THE INVENTION

The embodiments disclosed herein present at least one novel and non-trivial system, device, and method for generating an overlay of navigation chart information. As embodied herein, the navigation information printed or published in one chart may overlay the navigation information printed or published in another chart; moreover, the navigation information may be reproduced to look like the navigation information as it visually appears on the navigation charts. By presenting navigation information as it looks in multiple charts on one screen at the same time, a clear and coherent image of present and future navigation needs may be formed by the pilot while removing the burden of having to switch between navigation charts.

In one embodiment, a system for generating an overlay of navigation chart information is disclosed. The system may be comprised of a pilot input data source, a navigation chart data source, and a chart generator ("CG") configured to perform the method disclosed below for the establishing and updating of an image data set. The system may further include a display unit configured to receive the image data set provided by the CG, from which navigation chart information of one chart is overlaid against the navigation chart information of another chart and presented on the screen of the display unit.

In another embodiment, a device for generating an overlay of navigation chart information is disclosed. The device may be the CG configured to perform the method disclosed in the following paragraph. The device could include input and output interfaces to facilitate the receiving of the pilot input data and the navigation chart data and the providing of the image data set to the display unit. The CG and the input and output interfaces could be part of a module such as a printed circuit board.

In another embodiment, a method for generating an overlay of navigation chart information is disclosed, where the method could be performed by the CG. When properly configured, the CG may establish an image data set, receive first input data, define a geographical region from the first input data, and update the image data set with overlay data based upon the geographical region.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
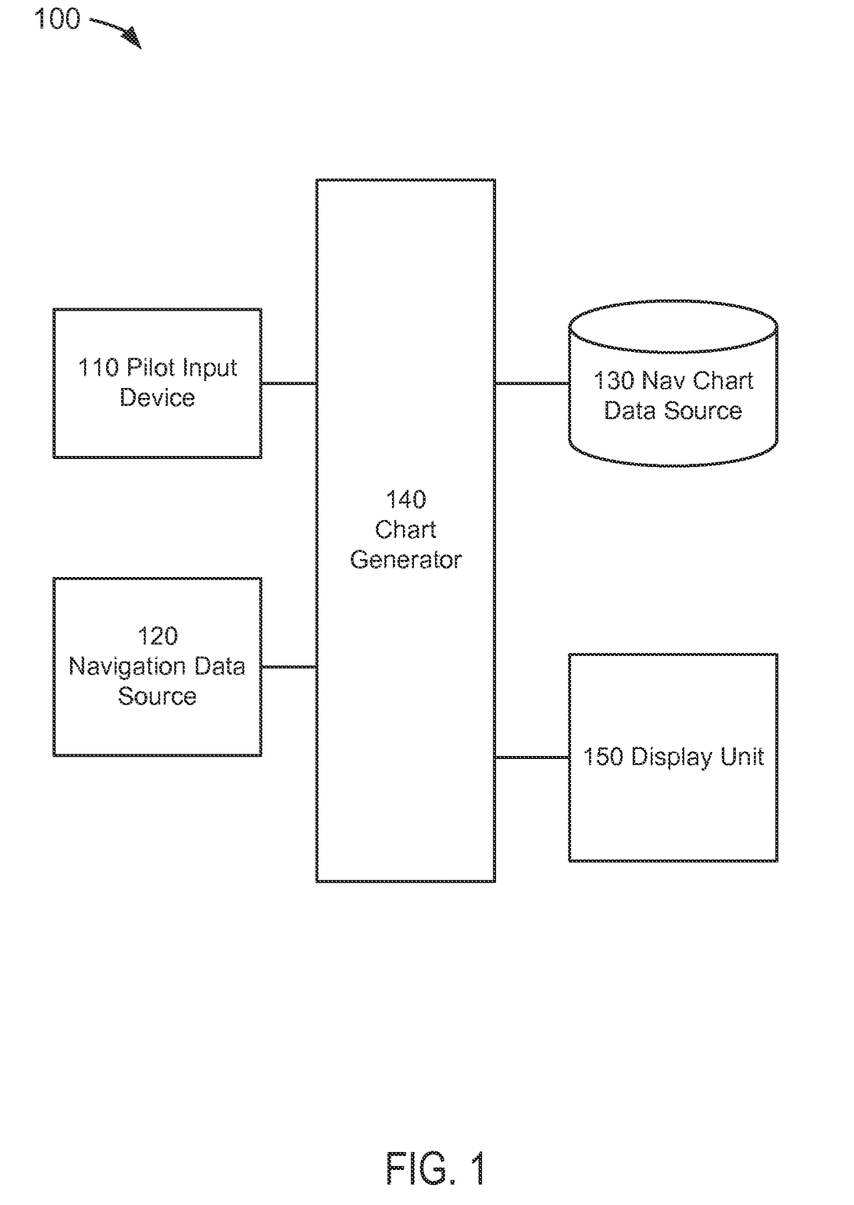
FIG. 1 depicts a block diagram of an overlay generating system.

FIG. 1 depicts a block diagram of an overlay generating system 100 suitable for implementation of the techniques described herein. The overlay generating system 100 of an embodiment of FIG. 1 includes a pilot input device 110, a navigation data source 120, a navigation chart data source 130, a chart generator ("CG") 140, and a display unit 150.

In an embodiment of FIG. 1, the pilot input device 110 could comprise any source for facilitating a pilot's interaction with the information displayed on the surface of a local display unit 150. The pilot input device 110 may include any device that allows for the manual selection of a geographical area published to an electronic chart. Such devices could include, but are not limited to, a tactile device (e.g., keyboard, control display unit, cursor control device, stylus, electronic grease pen, handheld device, touch screen device, notebook, tablet, electronic flight bag, etc. . . . ) and/or speech recognition systems. The pilot input device 110 could be integrated with the display unit 150 if it is configured to receive pilot input (e.g., handheld device, touch screen device, notebook, tablet, etc. . . . ). It should be noted that, although the discussion herein is drawn to the term "pilot," the definition of such term should not be limited to flight personnel but should include ground personnel, a driver of any vehicle, any viewer, and/or any user of the display unit 150. As embodied herein, the pilot input device 110 may provide input representative of a pilot's selection to a CG 140.

In an embodiment of FIG. 1, the navigation data source 120 comprises the system or systems that could provide navigation data information in a vehicle such as, but not limited to, an aircraft. It should be noted that data, as embodied herein for any source or system in an aircraft, could be comprised of any analog or digital signal, either discrete or continuous, which could contain information. As embodied herein, aircraft could mean any vehicle which is able to fly through the air or atmosphere including, but not limited to, lighter than air vehicles and heavier than air vehicles, wherein the latter may include fixed-wing and rotary-wing vehicles.

The navigation data source 120 may include, but is not limited to, an air/data system, an attitude heading reference system, an inertial guidance system (or inertial reference system), a radio navigation system, and a global navigation satellite system (or satellite navigation system), all of which are known to those skilled in the art. As embodied herein, the navigation data source 120 could provide navigation data including, but not limited to, data representative of ownship position and heading information. As embodied herein, the pilot input device 110 (e.g., handheld device, notebook, tablet, etc. . . . ) could be integrated with the navigation data source 120 (e.g., global navigation satellite system) to receive position information and/or configured to receive position information through a wired data bus and/or wireless network from the navigation data source 120 installed in an aircraft. As embodied herein, navigation data may be provided to the CG 140 for subsequent processing as discussed herein.

In an embodiment of FIG. 1, the navigation chart data source 130 could comprise any source of navigation information data. A navigation chart may be any map or chart which provides navigation information to assist in the navigation of a vehicle. As embodied herein, the navigation chart may be comprised of one or more navigation charts, and a non-exhaustive list of navigation charts includes an aeronautical chart to assist in the navigation of an aircraft, a nautical chart for watercraft, and/or a roadmap for automobiles. As embodied herein, navigation chart data may be provided to the CG 140 for subsequent processing as discussed herein.

It should be noted that, for the purpose of illustration and not of limitation, the discussion that follows will be drawn to aeronautical charts. Furthermore, although the discussion will be drawn to aeronautical charts published by the United States ("U.S.") Federal Aviation Administration ("FAA"), the embodiments herein are not limited to aeronautical charts published by this aviation governing authority but include those published by other aviation governing and/or non-governing authorities.

The FAA publishes many types of aeronautical charts including, but not limited to, VFR (i.e., Visual Flight Rules) Charts and IFR (e.g., Instrument Flight Rules) Charts. The VFR Charts include Section Aeronautical Charts, Terminal Area Charts, U.S. Gulf Coast VFR Aeronautical Charts, Grand Canyon VFR Aeronautical Chart, World Aeronautical Charts, and Helicopter Charts; the IFR Charts include IFR Enroute Low Altitude Charts, Area Charts, and IFR Enroute High Altitude Charts. All of these charts and the information printed on them are known to those skilled in the art, where a legend corresponding to the information is provided on each chart. While the discussion herein will be drawn to navigation information "printed on" paper charts, the usage of the term "printed on" is synonymous and interchangeable with information "published to" charts, where charts that are "published to" could be those charts on which information is not actually printed; for example, information may be "published to" chart that are presented electronically on the screen of the display unit 150.

Section Aeronautical Charts (singularly, "SAC") are considered the primary navigational reference medium used by the VFR pilot community. The SAC series is designed for visual navigation of slow to medium speed aircraft. The topographical information featured includes terrain relief and visual checkpoints used for flight under visual flight rules. The checkpoints include populated places, drainage patterns, roads, railroads, and other distinctive landmarks. The aeronautical information on these charts includes visual and radio aids to navigation, airports, controlled airspace, restricted areas, obstructions, and related data. The scale of the SAC is 1:500,000 (6.86 nautical miles per inch ("nm/inch")).

Terminal Aeronautical Charts (singularly, "TAC") provide a large-scale portrayal of selected metropolitan complexes to satisfy pilotage and local control requirements. The TAG series depicts the airspace designated as Class B Airspace. The information found on the TAC portrays much more detail than is found on the SAC because of the larger scale. These charts are intended for use by pilots operating from airfields within or near Class B and Class C airspace. The scale of the TAC is 1:250,000 (3.43 nm/inch).

The U.S. Gulf Coast VFR Aeronautical Chart is designed primarily for helicopter operations in the Gulf of Mexico area. Information depicted includes offshore mineral leasing areas and blocks, oil drilling platforms, and high-density helicopter activity areas. The scale of this chart is 1:1,000,000 (13.7 nm/inch).

The Grand Canyon VFR Aeronautical Chart covers the Grand Canyon National Park area and is designed to promote aviation safety and facilitate VFR navigation in this popular flight area. The chart contains aeronautical information for the general aviation VFR pilots on the front side, and commercial VFR air tour operations on the backside. Special features on both sides include Special Flight Rules Area, five Flight Free Zones, corridors between Flight Free Zones, special air-to-air communication frequencies and altimeter procedures, and numerous VFR checkpoints for ease of location identification. The scale of this chart is 1:250,000 (3.43 nm/inch).

World Aeronautical Charts (singularly, "WAC") are charts designed for navigation by moderate speed aircraft and aircraft operating at high altitudes. The topographical information includes city tints, principal roads, railroads, distinctive landmarks, drainage patterns and relief. The aeronautical information includes visual and radio aids to navigation, airports, airways, restricted areas, obstructions and other pertinent data. Because the scale is 1:1,000,000 (13.7 nm/inch), each WAC does not show as much detailed information as appears on the SAC and the TAC covering the same geographical region.

Helicopter Route Charts (singularly, "HRC") are three-color charts that depict current aeronautical information useful to helicopter pilots navigating in areas with high concentrations of helicopter activity. Information depicted includes helicopter routes, four classes of heliports with associated frequency and lighting capabilities, NAVAIDS, and obstructions. In addition, pictorial symbols, roads, and easily-identified geographical features are portrayed. The scale of the HRC is 1:125,000 (1.7 nm/inch).

Figure 2A:
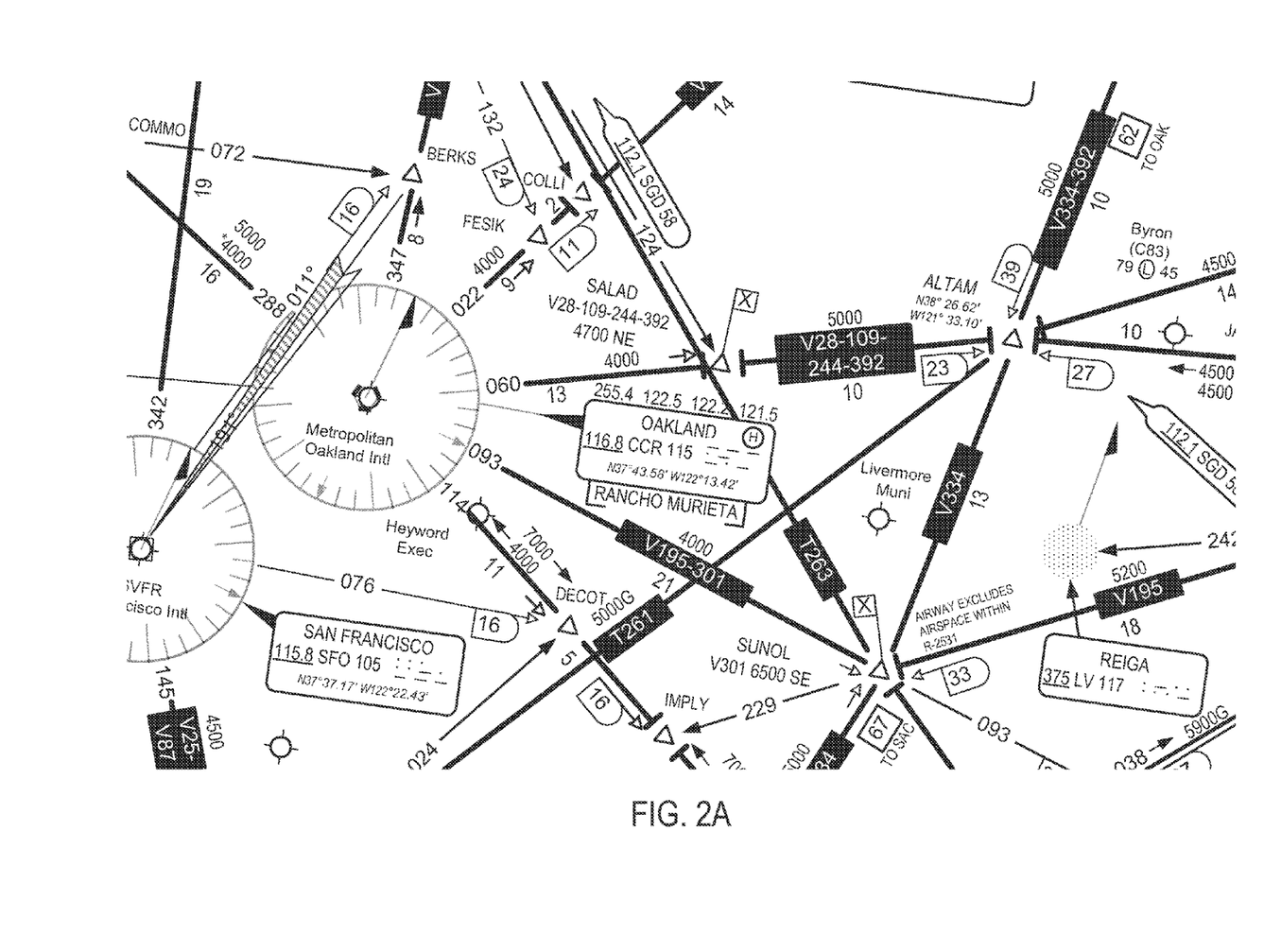
FIG. 2A illustrates first navigation information published to a first navigation chart.

IFR Enroute Low Altitude Charts (singularly, "ELAC") provide aeronautical information for navigation under IFR below 18,000 feet mean sea level ("MSL"). The four-color ELAC series provides aeronautical information which includes air traffic services, airports that have an instrument approach procedure or a minimum 3,000 feet hard surface runway, airways/route data, cruising altitudes, fixes/air traffic control reporting points, limits of controlled airspace, military training routes, off-route obstruction clearance altitudes, radio aids to navigations, area navigation ("RNAV") routes, special use airspace areas, and tabulations. The scales of the ELAC series vary from 5 nm/in to 20 nm/in. For example, the ELAC identified as L-3 (overlapping g geographic region which includes San Francisco International Airport and Los Angeles International Airport) has a scale of 8 nm/inch, and the ELAC identified as L-4 chart (overlapping a geographic region which includes Los Angeles International Airport and San Diego International Airport) has a scale of 7 nm/inch. An example of aeronautical information printed on an ELAC is illustrated in FIG. 2A which shows information printed on an area of the L-3 ELAC for the geographical region around San Francisco International Airport (the Class B and C Airspaces printed on the chart have been intentionally omitted).

Area Charts provide aeronautical information for navigation under IFR in congested terminal areas (e.g., Atlanta, Detroit, Jacksonville, Miami, Minneapolis, St. Louis, Washington, Chicago, Dallas/Fort Worth, Denver, Kansas City, Los Angeles, Phoenix, and San Francisco) at a larger scale than the ELACs. For example, the San Francisco area chart has a scale of 6 nm/inch, and the Los Angeles area chart has a scale of 5 nm/inch.

Figure 2B:
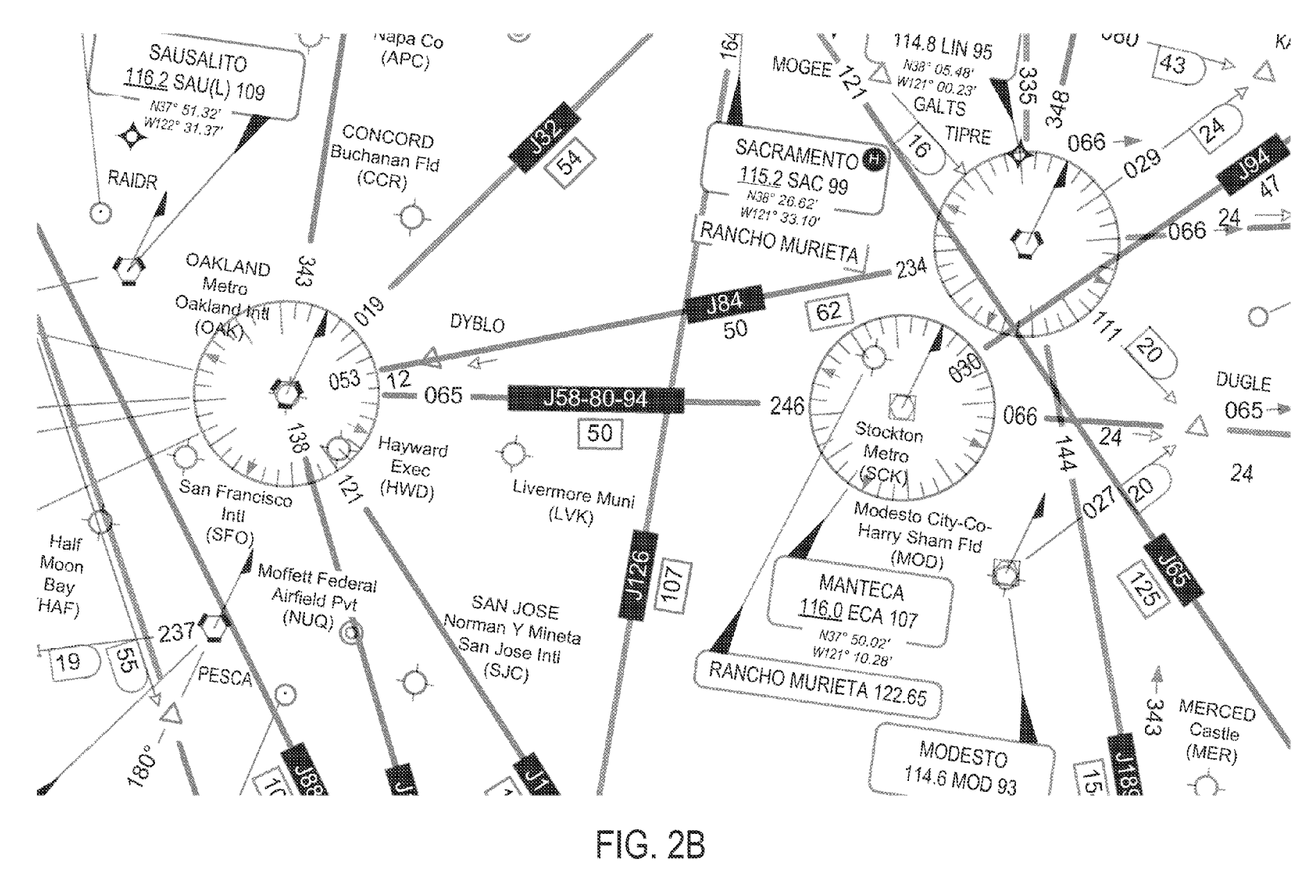
FIG. 2B illustrates second navigation information published to a second navigation chart.

IFR Enroute High Altitude Charts (singularly, "EHAC") are designed for navigation at or above 18,000 feet MSL. The four-color EHAC series includes jet route structure, RNAV Q-Routes, VHF radio aids to navigation, selected airports, reporting points, and Navigation Reference System waypoints. The scale of the EHAC covering the contiguous U.S. is 20 nm/inch. An example of aeronautical information printed on the EHAC identified as H-3 is illustrated in FIG. 2B which shows information printed on an area of the H-3 EHAC for the geographical region around San Francisco International Airport. Because of the different scales between H-3 EHAC and L-3 ELAC, a larger geographic region around San Francisco International Airport is shown in FIG. 2B.

Returning to FIG. 1, the CG 140 may be any electronic data processing unit which executes software or computer instruction code that could be stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. The CG 140 may be driven by the execution of software or computer instruction code containing algorithms developed for the specific functions embodied herein. The CG 140 may be an application-specific integrated circuit (ASIC) customized for the embodiments disclosed herein. Common examples of electronic data processing units are microprocessors, Digital Signal Processors (DSPs), Programmable Logic Devices (PLDs), Programmable Gate Arrays (PGAs), and signal generators; however, for the embodiments herein, the term "processor" is not limited to such processing units and its meaning is not intended to be construed narrowly. For instance, the processor could also consist of more than one electronic data processing unit. As embodied herein, the CG 140 could be a processor(s) used by or in conjunction with any other system of the aircraft including, but not limited to, the pilot input device 110, the navigation data source 120, the navigation chart data source 130, and the display unit 150, or any combination thereof.

The CG 140 may be programmed or configured to receive as input data representative of information obtained from various systems and/or sources including, but not limited to, the pilot input device 110, the navigation data source 120, and the navigation chart data source 130. As embodied herein, the terms "programmed" and "configured" are synonymous and interchangeable. The CG 140 may be electronically coupled to systems and/or sources to facilitate the receipt of input data. As embodied herein, operatively coupled may be considered as interchangeable with electronically coupled. It is not necessary that a direct connection be made; instead, such receipt of input data and the providing of output data could be provided through a wired data bus or through a wireless network. The CG 140 may be programmed to execute the method discussed in detail below. The CG 140 may be programmed to provide output data to various systems and/or units including, but not limited to, the display unit 150.

In an embodiment of FIG. 1, the display unit 150 could comprise any unit which presents a visual reproduction of a navigational chart on the screen of the display unit 150. The display unit could be installed permanently in ownship and/or a portable device (e.g., handheld device, notebook, tablet, etc. . . . ). The display unit 150 could comprise any unit having a display surface on which chart information may be presented to the pilot. The display unit 150 could be, but is not limited to, a Primary Flight Director, Navigation Display, Head-Up Display, Head-Down Display, Multi-Purpose Control Display Unit, EICAS, Electronic Centralized Aircraft Monitor, Multi-Function Display ("MFD"), Side Displays, and Data Link Control Display Unit. As stated above, the display unit 150 could be integrated with the pilot input device 110 that is configured to receive pilot input (e.g., handheld device, touch screen device, notebook, tablet, etc. . . . ) from the CG 140.

In one embodiment herein, the display unit 150 could be configured to display the position of ownship against the background of the visual appearance of a navigation chart reproduced on the screen of the display unit 150; as ownship moves, the information shown on the chart will move. Ownship position may be determined from data provided by the navigation data source 120, and the visual appearance of a navigation chart may be reproduced from data provided by the navigation chart data source 130, where data retrieved from the navigation chart data source 130 may be retrieved automatically based upon the ownship position data. The navigation chart that is reproduced on the screen may be presented in the background when used in conjunction with one or more aircraft systems such as, but not limited to, an airborne collision avoidance system or weather system which may generate and/or present traffic information or weather information, respectively. As embodied herein, the display unit 150 may receive image data provided by the CG 140.

Figure 3A:
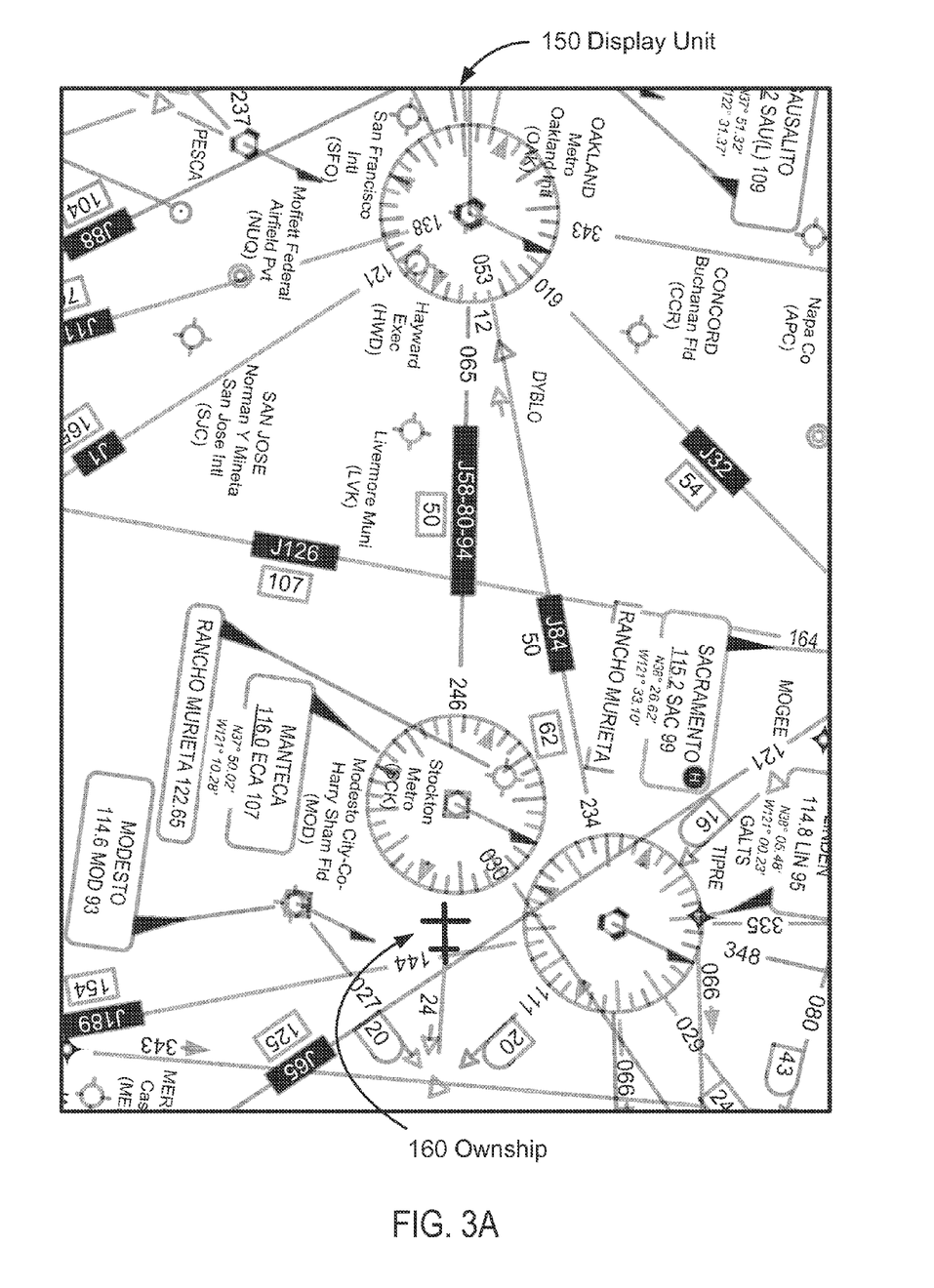
FIG. 3A illustrates the first navigation information presented on a display unit as it visually appears on the first navigation chart.
Figure 3B:
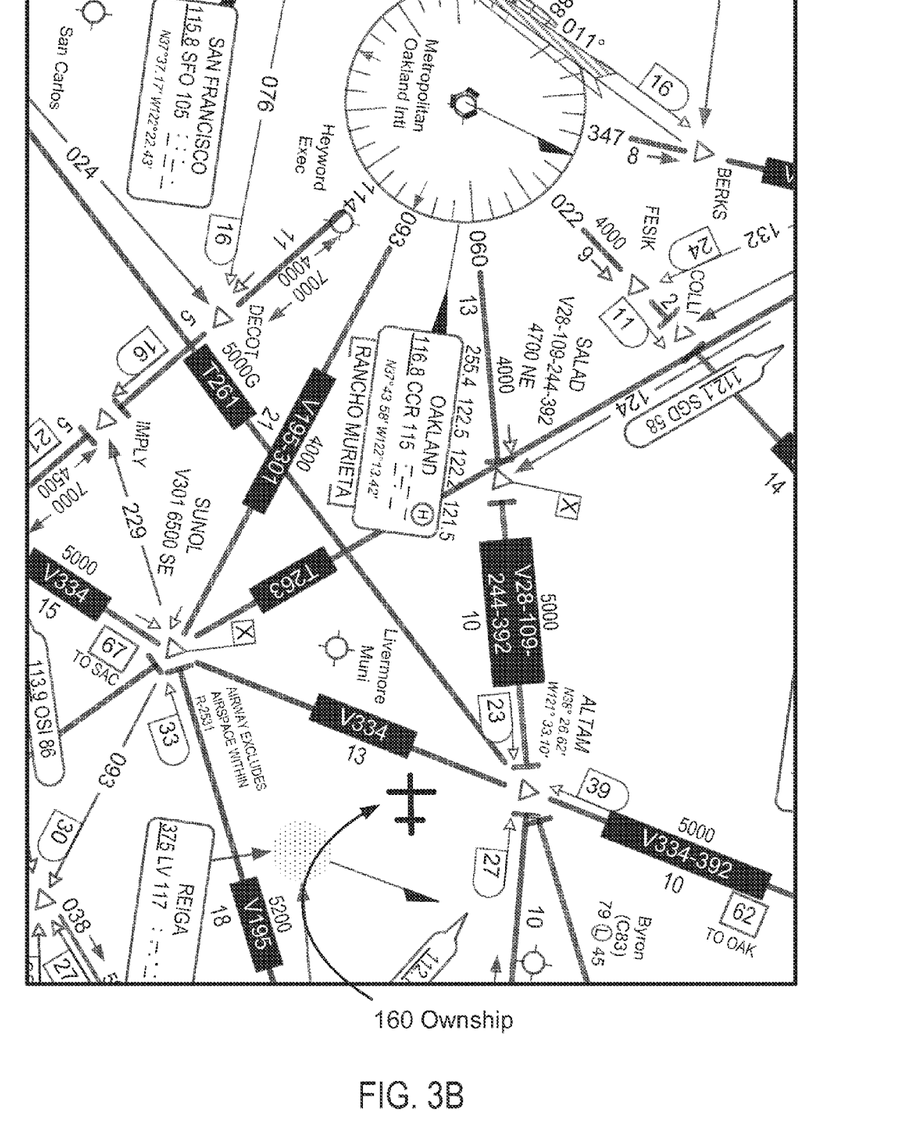
FIG. 3B illustrates the second navigation information presented on a display unit as it visually appears on the second navigation chart.

The display unit 150 may be configured to present an image reproducing the visual appearance of a navigation chart as shown in the drawings of FIGS. 3A and 3B. For the purpose of illustration and not limitation, the screen layout for the display unit 150 has been configured to present one window. Although the following discussion will be drawn to a one-window screen layout, the image may be presented in a multiple-window screen layout.

Referring to FIG. 3A, chart information printed on the H-3 EHAC has been reproduced and presented on the screen of the display unit 150, where presentation of the chart information is oriented to the heading of ownship. As indicated by the chart information, ownship 160 is located in between the Manteca VOR/DME and the DUGLE navigation fix (as shown in FIG. 2B) and heading westerly towards the Manteca VOR/DME. With the use of algorithm(s) known to those skilled in the art, the CG 140 may be programmed to receive ownship position and/or heading information from the navigation data source 120, retrieve chart information from the navigation chart data source 130 corresponding to the ownship position information, and overlay the position of ownship 160 against the background of chart and/or orient the chart in the direction of the heading of ownship.

Referring to FIG. 3B, chart information printed on the L-3 ELAC has been reproduced and presented on the screen of the display unit 150 and oriented to the heading of ownship. As indicated by the chart information, ownship 160 is located southerly of the ALTAM navigation fix, northeasterly of Livermore Municipal Airport, and heading westerly towards the Metropolitan Oakland International Airport and Oakland VORTAC.

Figure 4A:
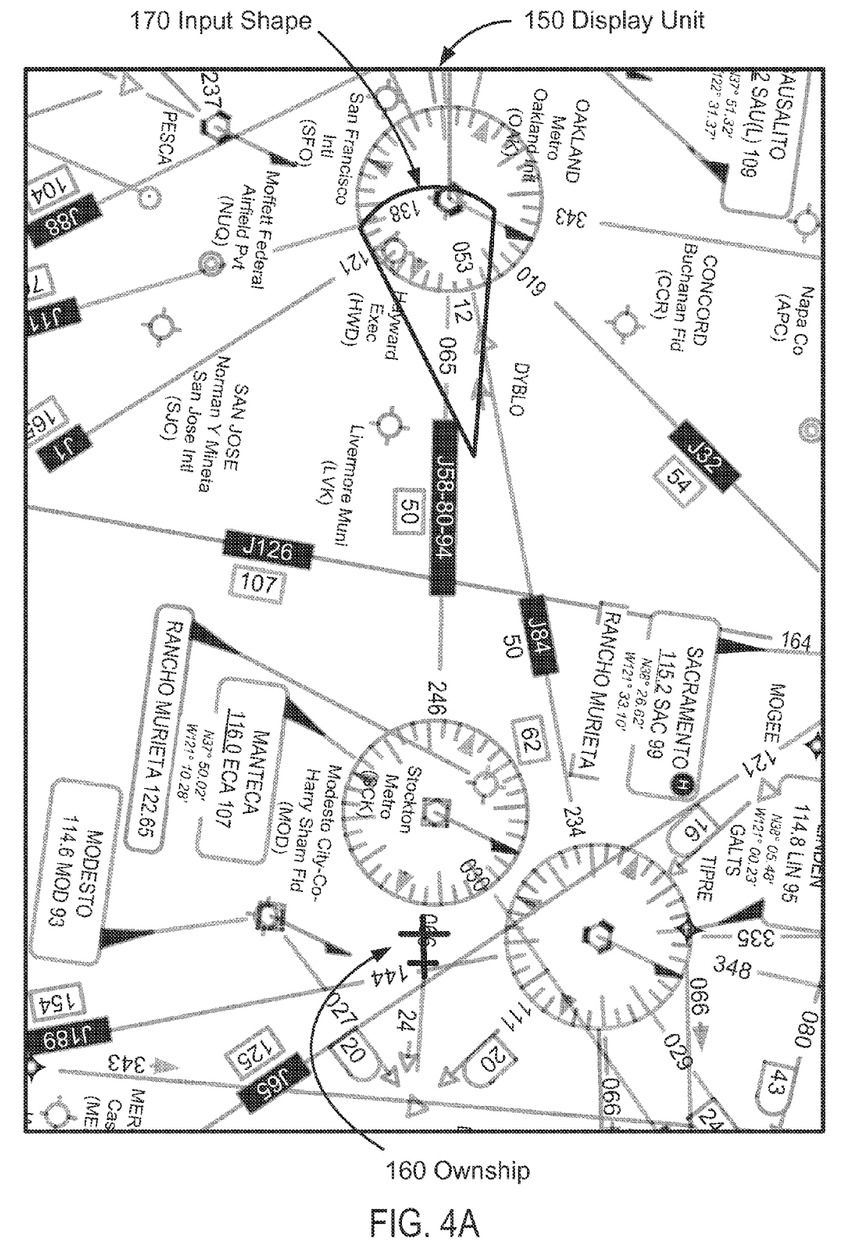
FIG. 4A illustrates an input shape against the first navigation information presented on a display unit.
Figure 4B:
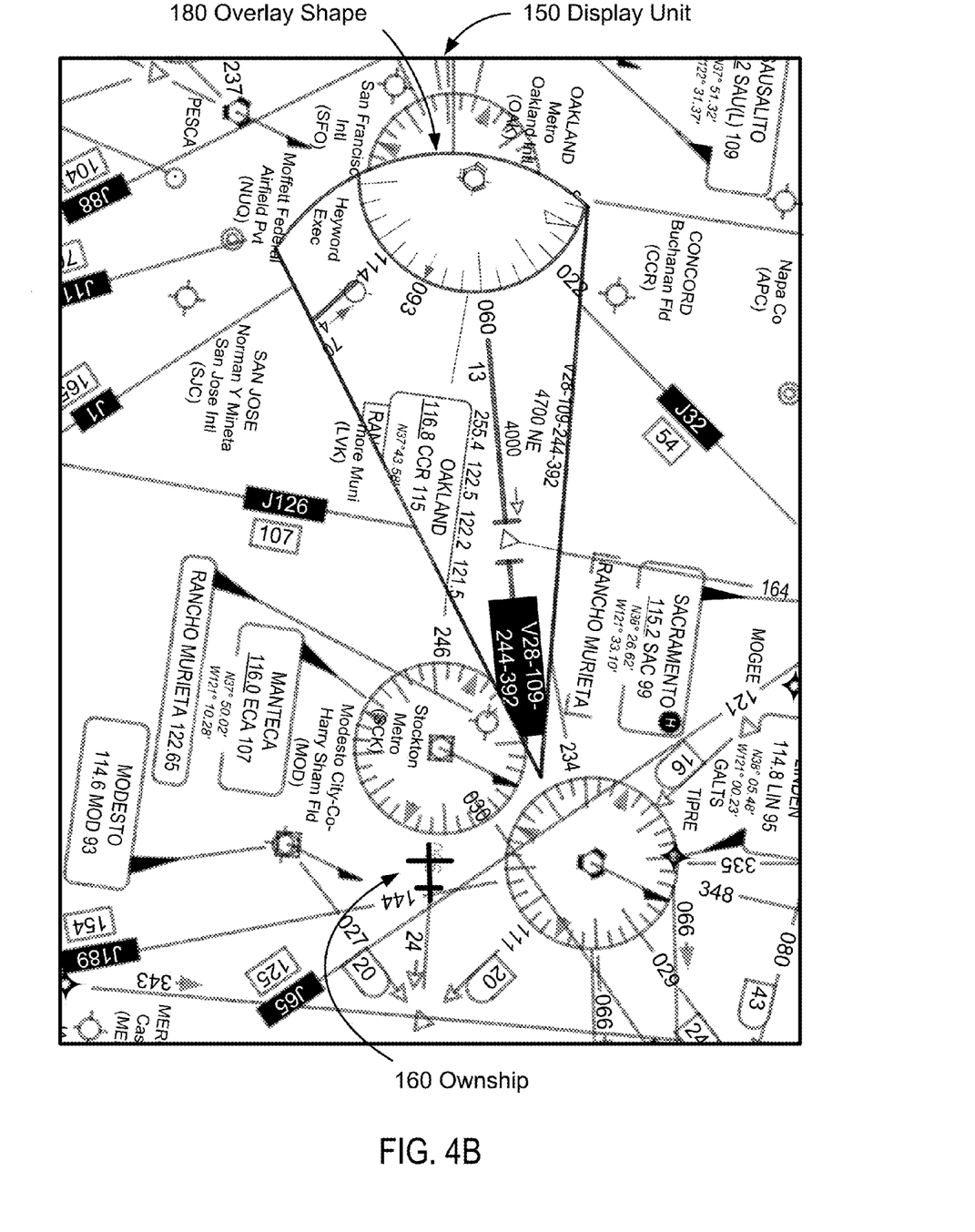
FIG. 4B illustrates the second navigation information presented on the display unit as an overlay against the first navigation information.

The advantages and benefits of the embodiments discussed herein may be illustrated in the drawings of FIGS. 4A and 4B by showing an example of presenting chart information from one chart over the chart information of a second chart. The image presented screen of the display unit 150 of FIG. 3A is presented in FIG. 4A. In addition to presenting the position of ownship 160 against the background of H-3 EHAC information as shown in FIG. 3A, the CG 140 of FIG. 4A has been configured to receive input data from the pilot input device 110 corresponding to a pilot's entry of an input shape 170 and present the entry on the screen of the display unit 150. It should be noted that, although the discussion herein will be drawn to a single input shape, the input data could represent multiple shapes shown on the same screen at the same time. For the purpose of illustration and not of limitation, it will be assumed that the pilot input device 110 is the touch screen of the display unit 150, and that the pilot has drawn the input shape 170 comprised of a wedge.

From the screen coordinates of the input shape 170, the boundaries of the input shape may be used to determine the boundaries of the geographic region corresponding to the input shape 170. Then, the CG 140 may retrieve data representative of chart information of a second chart for the geographic region from the navigation chart data source 130 and overlay the chart information of the second chart on top of the first chart. As shown in FIG. 4B, the chart information of a second chart is the information printed on the L-3 ELAC. As observed, the overlay shape is the same as the input shape, and the size of the overlay shape is 2.5 times larger than the input shape, where the size is determined as a proportion of scales between the first scale and the second scale; as stated above, the scale of the H-3 EHAC is 20 nm/inch which is 2.5 times greater than the 8 nm/inch scale of the L-3 ELAC. If multiple input shapes have been received, an overlay could be generated for each input shape in the same manner as a single overlay is generated.

Figure 5:
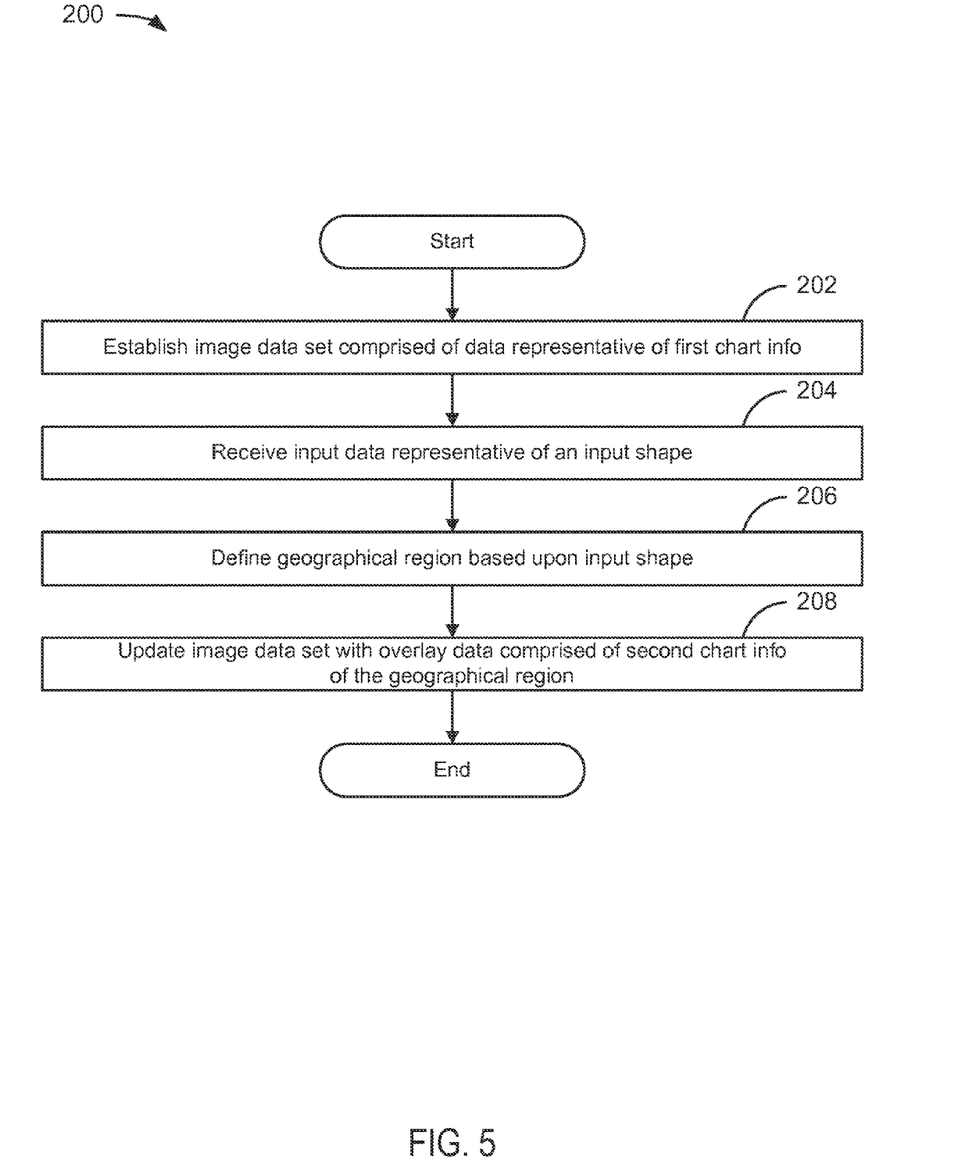
FIG. 5 provides a flowchart illustrating a method for generating an overlay of navigation chart information.

FIG. 5 depicts flowchart 200 providing examples for presenting chart information from one chart over the chart information of a second chart, where the CG 140 may be programmed or configured with instructions corresponding to the following modules. As embodied herein, the CG 140 may be a processor of an indicating system comprising one or more display units. Also, the CG 140 may be a processor of a module such as, but not limited to, a printed circuit card having one or more input interfaces to facilitate data communications with the CG 140, i.e., the receiving and providing of data. As necessary for the accomplishment of the following modules embodied in FIG. 5, the receiving of data is synonymous and/or interchangeable with the retrieval of data, and the providing of data is synonymous and/or interchangeable with the making available or supplying of data.

The method of flowchart 200 begins with module 202 with the establishing of image data from which an image may be subsequently presented on the screen of the display unit 150; as embodied herein, the establishing of image data could include the generating of such image data by techniques known to those skilled in the art.

The image data may be comprised of data representative of chart information that is printed on a chart of a known scale. The visual appearance of the chart information as it is printed on the chart may be reproduced and presented on the screen of the display unit 150. The data representative of chart information may be retrieved from the navigation chart data source 130, where the chart information includes scale information. The retrieval of the data could be based upon navigation information received from the navigation data source 120, where such navigation information could be comprised of ownship position from which heading information may be ascertained.

The method continues with module 204 with the receiving of input data through the pilot input device 110. The input shape could be defined by screen locations on the display unit 150 that represent the boundaries of the input shape. In one embodiment, the input shape could be created by the pilot through one of a plurality of tactile devices (e.g., touch screen, electronic grease pen, cursor, etc. . . . ). In another embodiment, the CG 140 could be configured with a default input shape that could be selectable by the pilot through, for instance, a menu configured for the display unit 150 and/or speech recognition systems.

For the purpose of illustration and not limitation, the default input shape could be the shape of the wedge shown in the drawings of FIGS. 3A through 4B that originates at or near ownship 160 and extends upwardly towards the top of the display unit 150. The size could be fixed or variable. Where the size is fixed, the size of the default input shape could correspond to a default distance (e.g., 30 nm) and/or pilot-selectable distance (e.g., 10 nm, 20 nm, 30 nm, etc. . . . ), where such distance may be measured using the scale of a chart or screen pixels. Where the size is variable, the size of the default input shape could be based on time (e.g., 10 minutes ahead of ownship) where the speed of ownship may be determined from the data received from the navigation data source 120.

The method continues with module 206 with the defining of a geographical region based upon the boundaries of the input shape. As embodied herein, the chart information represented in the data retrieved from the navigation chart data source 130 may include geographical reference information (e.g., latitude and longitude) of the chart. The geographic reference information could be mapped to screen locations using common algorithms known to those skilled in the art, from which the boundaries of the geographical region may be defined using the boundaries of the input shape.

The method continues with module 208 with the updating of the image data set with overlay data representative of an overlay having an initial shape as the input shape. The overlay data may be comprised of second data representative of second chart information that is printed on a second chart of a known second scale. The overlay may reproduce the visual appearance of the second chart information as it is printed on the chart. The data representative of second chart information coinciding to the geographical region may be retrieved from the navigation chart data source 130, where the second chart information includes second scale information. The retrieval of the overlay data could be based upon navigation information received from the navigation data source 120, where such navigation information could be comprised of ownship position and/or ownship heading.

In one embodiment, the size of the overlay may be determined as a proportion between the first scale and the second scale. The first scale of the H-3 EHAC of 20 nm/inch and the second scale of L-3 ELAC of 8 nm/inch scale resulted in an overlay size being 2.5 times greater than the input shape size. In another embodiment, a multiplier may be applied to the second chart information to modify the visual appearance of the second chart information and the size of the overlay.

The application of the multiplier could act as a common zoom function by reducing or expanding the size of the aeronautical information in the overlay while maintaining the visual appearance of the second chart information as it is printed on the second chart. For example, a multiplier of 0.5 could be applied to the second chart information. As a result, the resulting overlay size would be 1.25 times (2.5*0.5) greater than the input shape, but the size of the aeronautical information would be reduced by 0.5. This could result with thinner airway lines and smaller text and symbols; a multiplier of 0.4 could result with an overlay size being the same size (2.5*0.4=1.0) as the input shape with even thinner airway lines and smaller text and symbols. As embodied herein, the multiplier could be set to a default position (e.g., 1.0) and/or selectable (e.g., 0.5, 0.4, etc. . . . ) by the pilot through, for instance, a menu configured for the display unit 150 and/or speech recognition systems.

In another embodiment, the CG 140 may be programmed to receive input data from the pilot input device corresponding to a resizing, reshaping, and/or repositioning of the overlay. If the overlay is resized, the second chart information may remain the same, but the size of the second chart information may be affected; for example, reducing the size of the overlay could reduce the size of the second chart information presented in the overlay. If the overlay is reshaped and/or repositioned, the boundaries of the overlay are modified which means a modification of the boundaries of the geographical region. Because the geographical region is used in the retrieval of data representative of second chart information from the navigation chart data source 130, the content of the second chart information may change with a reshaping, and/or repositioning of the overlay. Algorithm(s) used for resizing, reshaping, and/or repositioning are known to those skilled in the art. Then, the method of flowchart 200 proceeds to the end.

It should be noted that the method steps described above may be embodied in computer-readable media as computer instruction code. It shad be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for generating an overlay of navigation chart information, said system comprising:
    a source of pilot input data;
    a source of navigation chart data; and
    a chart generator configured to
        establish an image data set comprised of first data representative of an image of first navigation chart information, where
            the first data has been retrieved from the source of navigation chart data by a first retrieval operation, and
            the image of first navigation chart information is comprised of an exact copy of information and appearance as shown on a first printed navigation chart, where
                the first printed navigation chart is printed to a first scale;
        receive first input data through the source of pilot input data, where
            the first input data is representative of a visible input shape comprised of boundaries and defined by screen coordinates;
        define a geographical region falling within the boundaries of the visible input shape; and
        update the image data set with second data representative of an overlay of second navigation chart information, where
            the second data has been retrieved from the source of navigation chart data by a second retrieval operation, where
                the second navigation chart information is comprised of information falling within the geographic region and is other than the first navigation chart information, and
                the second retrieval operation is a retrieval operation other than the first retrieval operation, and
            the overlay of second navigation chart information is comprised of an exact copy of information and appearance as shown on a second printed navigation chart, where
                the second printed navigation chart is printed to a second scale, and
                the second scale is a scale other than the first scale, such that
                    the overlay blocks all underlying first fixed visual information from view at a screen location of the visible input shape, and
                    the initial shape of the overlay is the same as the visible input shape.

2. The system of claim 1, wherein the size of the overlay is based upon the first scale and the second scale.

3. The system of claim 2, wherein the size of the overlay is further based upon a multiplier applied to the second scale.

4. The system of claim 1, wherein the retrieval of the first data and the second data is based upon navigation data provided by a navigation data source.

5. The system of claim 1, wherein
the visible input shape is comprised of a default input shape or a user-created input shape, where
the size of the default input shape is fixed, or
the size of the default input shape is variable and dependent upon navigation data provided by a navigation data source.

6. The system of claim 1, wherein
the chart generator is further configured to
receive second input data through the source of pilot input data, where
the second input data is representative of a change to the size, shape, or screen position of the overlay.

7. The system of claim 1, wherein the source of pilot input data is the touch screen of a display unit.

8. The system of claim 1, further comprising:
a display unit configured to
receive the image data set provided by the chart generator, and
present the second navigation chart information overlaying the first navigation chart information on the screen of the display unit.

9. A device for generating an overlay of navigation chart information, said device comprising:
an interface configured to facilitate communication with a chart generator; and
the chart generator configured to
establish an image data set comprised of first data representative of an image of first navigation chart information, where
the first data has been retrieved from the source of navigation chart data by a first retrieval operation, and
the image of first navigation chart information is comprised of an exact copy of information and appearance as shown on a first printed navigation chart, where
the first printed navigation chart is printed to a first scale;
receive first input data, where
the first input data is representative of a visible input shape comprised of boundaries and defined by screen coordinates;
define a geographical region falling within the boundaries of the visible input shape; and
update the image data set with second data representative of an overlay of second navigation chart information, where
the second data has been retrieved from the source of navigation chart data by a second retrieval operation, where
the second navigation chart information is comprised of information falling within the geographic region and is other than the first navigation chart information, and
the second retrieval operation is a retrieval operation other than the first retrieval operation, and
the overlay of second navigation chart information is comprised of an exact copy of information and appearance as shown on a second printed navigation chart, where
the second printed navigation chart is printed to a second scale, and
the second scale is a scale other than the first scale, such that
the overlay blocks all underlying first fixed visual information from view at a screen location of the visible input shape, and
the initial shape of the overlay is the same as the visible input shape.

10. The device of claim 9, wherein the size of the overlay is based upon the first scale and the second scale.

11. The device of claim 10, wherein the size of the overlay is further based upon a multiplier applied to the second scale.

12. The device of claim 9, wherein
the visible input shape is comprised of a default input shape or a user-created input shape, where
the size of the default input shape is fixed, or
the size of the default input shape is variable and dependent upon navigation data provided by a navigation data source.

13. The device of claim 9, wherein
the chart generator is further configured to
receive second input data representative of a change to the size, shape, or screen position of the overlay.

14. The device of claim 9, wherein the retrieval of the first data and the second data is based upon navigation data provided by a navigation data source.

15. The device of claim 9, wherein
the chart generator is further configured to
provide the image data set to a display unit, whereby
the second navigation chart information overlaying the first navigation chart information is presented on the screen of the display unit.

16. A method for generating an overlay of navigation chart information, said method comprising:
establishing image data set comprised of first data representative of an image of first navigation chart information, where
the first data has been retrieved by a first retrieval operation, and
the image of first navigation chart information is comprised of an exact copy of information and appearance as shown on a first printed navigation chart, where
the first printed navigation chart is printed to a first scale;
receiving first input data through a source of pilot input data, where
the first input data is representative of a visible input shape comprised of boundaries and defined by screen coordinates;
defining a geographical region falling within the boundaries of the visible input shape; and
updating the image data set with second data representative of an overlay of second navigation chart information, where
the second data has been retrieved by a second retrieval operation, where
the second navigation chart information is comprised of information falling within the geographic region and is other than the first navigation chart information, and
the second retrieval operation is a retrieval operation other than the first retrieval operation, and the overlay of second navigation chart information is comprised of an exact copy of information and appearance as shown on a second printed navigation chart, where the second printed navigation chart is printed to a second scale, and the second scale is a scale other than the first scale, such that the overlay blocks all underlying first fixed visual information from view at a screen location of the visible input shape, and the initial shape of the overlay is the same as the visible input shape.

17. The method of claim 16, wherein the size of the overlay is based upon the first scale and the second scale.

18. The method of claim 17, wherein the size of the overlay is further based upon a multiplier applied to the second scale.

19. The method of claim 16, wherein the visible input shape is comprised of a default input shape or a user-created input shape, where the size of the default input shape is fixed, or the size of the default input shape is variable and dependent upon navigation data provided by a navigation data source.

20. The method of claim 16, further comprising:

receiving second input data through the source of pilot input data, where the second input data is representative of a change to the size, shape, or screen position of the overlay.

21. The method of claim 16, wherein the retrieval of the first data and the second data is based upon navigation data provided by a navigation data source.

22. The method of claim 16, further comprising:

providing the image data set to a display unit, whereby the second navigation chart information overlaying the first navigation chart information is presented on the screen of the display unit.

\* \* \* \* \*